US007398939B2

(12) United States Patent
Terauchi et al.

(10) Patent No.: US 7,398,939 B2
(45) Date of Patent: Jul. 15, 2008

(54) ELECTRIC FISHING REEL

(75) Inventors: Takashi Terauchi, Tokorozawa (JP); Shinji Murakami, Higashikurume (JP)

(73) Assignee: Daiwa Seiko, Inc., Higashikurume-shi (JP)

( * ) Notice: Subject to any disclaimer, the term of this patent is extended or adjusted under 35 U.S.C. 154(b) by 0 days.

(21) Appl. No.: 11/854,262

(22) Filed: Sep. 12, 2007

(65) Prior Publication Data
US 2008/0073455 A1 Mar. 27, 2008

(30) Foreign Application Priority Data
Sep. 22, 2006 (JP) ............................. 2006-257513

(51) Int. Cl.
*A01K 89/01* (2006.01)
(52) U.S. Cl. ........................ 242/250; 242/225; 242/253; 242/261; 242/271
(58) Field of Classification Search ................. 242/225, 242/250, 253, 255, 259, 260, 261, 271
See application file for complete search history.

(56) References Cited

U.S. PATENT DOCUMENTS 3,932,954 A * 1/1976 Wyroski ..................... 242/225
4,283,025 A * 8/1981 Whisenhunt ................. 242/250
4,515,324 A * 5/1985 Barton ........................ 242/250
4,771,964 A * 9/1988 Watanabe et al. ........... 242/250
5,556,047 A * 9/1996 Nanbu ......................... 242/250
6,896,216 B2 * 5/2005 Chiba ......................... 242/250
7,175,120 B2 * 2/2007 Ono ........................... 242/250

FOREIGN PATENT DOCUMENTS

JP 05316908 A * 12/1993
JP 2002-000145 1/2002

* cited by examiner

*Primary Examiner*—Emmanuel M Marcelo
(74) *Attorney, Agent, or Firm*—Sughrue Mion, PLLC

(57) ABSTRACT

An electric fishing reel has a power transmission mechanism for transmitting rotational driving force based on a drive motor and a manual handle to a spool; and a clutch mechanism for switching the power transmission mechanism between a power transmitting state and a power cutoff state. The power transmission mechanism includes a planetary gear mechanism disposed on the drive motor; a first rotor with which the planetary gear mesh; a second rotor which is driven and coupled to the first rotor through a belt; and a clutch actuating member fitted and rotationally locked in the second rotor to be movable in an axial direction and is moved in the axial direction. An engaging portion of the clutch actuating member is capable of switching the power transmission mechanism between a power transmitting state and a power cutoff state by engaging with or disengaging from a retaining portion of the spool.

6 Claims, 3 Drawing Sheets

ELECTRIC FISHING REEL

BACKGROUND OF THE INVENTION

The present invention relates to an electric fishing reel of a manual/electric compatible type which has a drive motor for rotationally driving a spool supported rotatably on a reel body and which winds and drives a spool by the rotative operation of a manual handle provided on one side of the reel body.

Typically, an electric fishing reel is so constructed as to transmit the rotational driving force of a drive motor provided on a reel body to a spool through a planetary gear mechanism (reduction gear mechanism). Generally, a clutch mechanism for changing over the spool between a fishing line winding state and a fishing line releasing state (spool free state) is disposed in the power transmission route. In addition, the reel body is provided with a manual handle to allow not only the electrically powered driving using the drive motor but the winding drive of the spool by manual operation. The winding driving force applied by the manual handle is adapted to be transmitted to the spool through the clutch mechanism provided in the power transmission route.

In the electric fishing reel, since a planetary gear mechanism having planetary gears is interposed in the power transmission route of the spool, even if the clutch mechanism is switched over (clutch OFF) to the fishing line releasing state (spool free state), some gears of such as the planetary gears are rotated together with the spool in an interlocked manner, so that the rolling frictional resistance due to the meshing of gears is generated, resulting in inferior freely reeling-out performance. Hence, a problem remains that the fishing line with the terminal tackle cannot be reeled out speedily.

Accordingly, to overcome such a problem, JP-A-2002-145 discloses an electric fishing reel in which a drive coupling mechanism of a drive motor is interposed serially in a drive coupling mechanism from the manual handle to the spool, and the coupling between the manual handle coupling mechanism and the spool is cut off to reduce the rolling frictional resistance of the spool.

The clutch mechanism of the electric fishing reel disclosed in the above-described JP-A-2002-145 is adapted to axially move a power transmission gear provided on a spool shaft by operating a switching member (clutch lever) provided on the reel body. Namely, a retaining portion having a noncircular cross section is formed on the spool side of the power transmission gear, and the operation of the switching member causes the power transmission gear to slide in the axial direction, whereby the retaining portion of the power transmission gear is engaged with or disengaged from an engaging portion provided on the spool or a spool shaft integral with the spool, so as to switch between the power transmitting state (fishing line winding state) and the power cutoff state (fishing line reeling-out state).

However, the above-described power transmission gear is in a state of meshing with the gear for transmitting the rotational driving force from the handle side (drive motor side), and is adapted to move the power transmission gear in the axial direction with the gears meshing each other. Therefore, there are problems in that damage is possibly caused to the power transmission gear, and the meshing driving noise becomes large.

In addition, since terminal tackle including a sinker having some weight is attached to a fishing line, the load in the rotating direction on the mutually meshing gears becomes disadvantageously large, so that it becomes difficult to switch the clutch from ON to OFF. Particularly in the meshing between gears, it is desirable to use helical gears whose contact ratio is high, whose meshing performance is excellent, and which produce small meshing driving noise. However, if consideration is given to the ease of disengaging the clutch (ease of axial movement of the power transmission gear), the helical gears cannot be used. In this case, even if helical gears are used, if satisfactory clutch operability is taken into consideration, the helix angle of the tooth trace cannot be made large, so that there is a limit to the improvement of the meshing performance.

SUMMARY OF THE INVENTION

The present invention has been devised on the basis of the above-described problems, and its object is to provide an electric fishing reel which is capable of attaining silencing during the winding drive of the spool by the drive motor and of carrying out light clutch switching operation.

In order to achieve the problem, the present invention is characterized by having the following arrangement.
(1) An electric fishing reel comprising:
    a reel body;
    a spool rotatably supported on the reel body;
    a drive motor and a manual handle provided on the reel body to rotationally drive the spool;
    a clutch mechanism for switching the spool between a power transmitting state and a power cutoff state;
    a rotor rotated by the drive motor and the manual handle; and
    a clutch actuating member which is fitted in and rotationally locked to the rotor so as to be movable in an axial direction and includes an engaging portion formed on one end of thereof, and a retaining portion rotated integrally with the spool,
    wherein the engaging portion is capable of being engaged with and disengaged from the retaining portion.
(2) The electric fishing reel according to (1), wherein a belt is wound around the rotor for power transmission.
(3) An electric fishing reel comprising:
    a reel body;
    a spool rotatably supported on the reel body;
    a drive motor and a manual handle provided on the reel body to rotationally drive the spool;
    a power transmission mechanism for transmitting rotational driving force based on the drive motor and the manual handle to the spool; and
    a clutch mechanism for switching the power transmission mechanism between a power transmitting state and a power cutoff state,
    wherein the power transmission mechanism includes:
        a planetary gear mechanism disposed on an output shaft of the drive motor;
        a first rotor having internal teeth with which a planetary gear of the planetary gear mechanism meshes and which is rotatably supported by the reel body;
        a second rotor which is driven and coupled to the first rotor through a belt and is rotatably supported by the reel body;
        a clutch actuating member which is fitted in and rotationally locked to the second rotor so as to be movable in an axial direction and is moved in an axial direction thereof by the clutch mechanism, the clutch actuating member including an engaging portion formed on one side thereof; and
        a retaining portion which is rotated integrally with the spool, and
    wherein the power transmission mechanism is capable of being switched between the power transmitting state and the power cutoff state by causing the engaging portion to engage with or disengage from the retaining portion.

(4) The electric fishing reel according to (3), wherein a support casing for accommodating the first rotor, the second rotor, and the belt for driving and coupling the both rotors is installed within a side plate of the reel body on a side of the manual handle.

(5) The electric fishing reel according to (3), wherein the engaging portion is overlappingly disposed on a radially inward side of a supporting portion of the reel body for rotatably supporting the second rotor.

(6) An electric fishing reel comprising:
a reel body;
a spool rotatably supported on the reel body;
a drive motor and a manual handle provided on the reel body to rotationally drive the spool;
a power transmission mechanism for transmitting rotational driving force based on the drive motor and the manual handle to the spool; and
wherein the power transmission mechanism includes:
a planetary gear mechanism disposed on an output shaft of the drive motor;
a first rotor having internal teeth with which a planetary gear of the planetary gear mechanism meshes and which is rotatably supported by the reel body;
a second rotor which is driven and coupled to the first rotor through a belt and is rotatably supported by the reel body; and
a drive gear disposed on a shaft of the manual handle to be rotated together with the first rotor;
wherein driving force by a rotational operation of the manual handle is transmitted to the spool through the drive gear, the first rotor, the belt and the second rotor.

According to the above-described construction, when the spool is switched from the power transmitting state to the power cutoff state by the clutch mechanism, the clutch actuating member rotationally locked so as to be movable in the axial direction with respect to the rotor is axially moved, and separated from the retaining portion integrally rotatable with the spool. A rotational load from the rotor which is a part of the power transmission does not act on the clutch actuating member and moved in the axial direction. Therefore, the switching operation of the clutch mechanism can be performed comfortably.

Incidentally, in the above construction, the rotor may have any structure which can transmit the power from the drive motor and the manual handle, and can be a gear, a rotor around which a belt is wound. The retaining portion engaged with and disengaged from the engaging portion of the clutch actuating member may have any structure which is provided at a portion integrally rotated with the spool, ad can be formed at a spool itself (for example, a side area of the spool) or be formed at an end portion of the spool shaft rotationally supporting the spool.

According to the above-described construction, when switching from the power transmitting state to the power cutoff state by the clutch mechanism, the clutch actuating member, which is fitted in and rotationally locked axially movably to the second rotor to which power is transmitted from the drive motor side through the first rotor and the belt, is moved in the axial direction and is disengaged from the retaining portion which is rotated integrally with the spool. For this reason, the clutch actuating member axially slides without a rotational load being applied thereto from the second rotor which is a power transmitting portion, so that the switching operation of the clutch mechanism can be performed lightly. In addition, since the construction provided is such that the power transmission between the first rotor and the second rotor is effected not by the meshing of gears but by means of the belt, tooth faces are not damaged during the actuation of the clutch mechanism, and silencing during driving can be accomplished.

It should be noted that the retaining portion for engagement with and disengagement from the engaging portion of the clutch actuating member is sufficient if it is provided on a portion which is rotated integrally with the spool, and may be formed on the spool itself (e.g., a side region of the spool) or at an end of the spool shaft for rotatably supporting the spool.

According to the invention, it is possible to obtain an electric fishing reel which is capable of attaining silencing during the winding drive of the spool by the drive motor and of carrying out light clutch switching operation.

According to the above-describe construction, the rotational driving force by the drive motor is transmitted to the spool through the belt wound around the first rotor and the second rotor. Therefore, noise (sound) at the time of driving the motor can be reduced. Further, the driving force by the manual handle is transmitted to the spool through the first rotor, the second rotor and the belt wound around it. Therefore, comparing with the power transmission by the mesh between the general gears, large mesh amount (wound length of the belt with respect to each rotor) can be secured, and there is no influence of the damage, the deformation and the like on a gear surface of the gear, thereby the rotation performance at the time of manual winding operation can be improved and smooth winding operation is achieved.

DESCRIPTION OF THE PREFERRED EMBODIMENTS

Referring to the accompanying drawings, a description will be given of an embodiment of the present invention.

Figure 1:
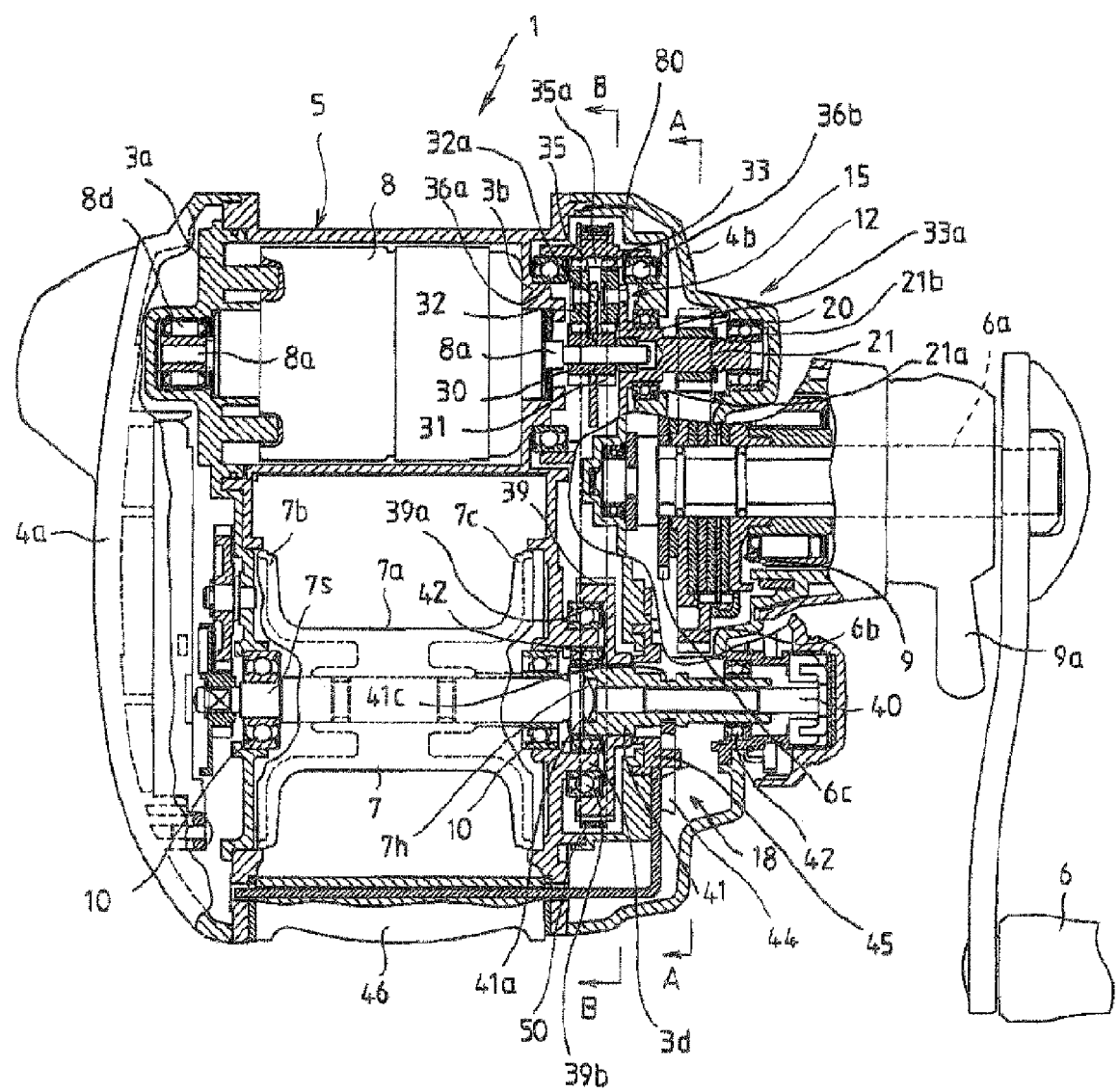
FIG. 1 is a plan view illustrating an internal structure of an electric fishing reel in accordance with an embodiment of the invention.
Figure 2:
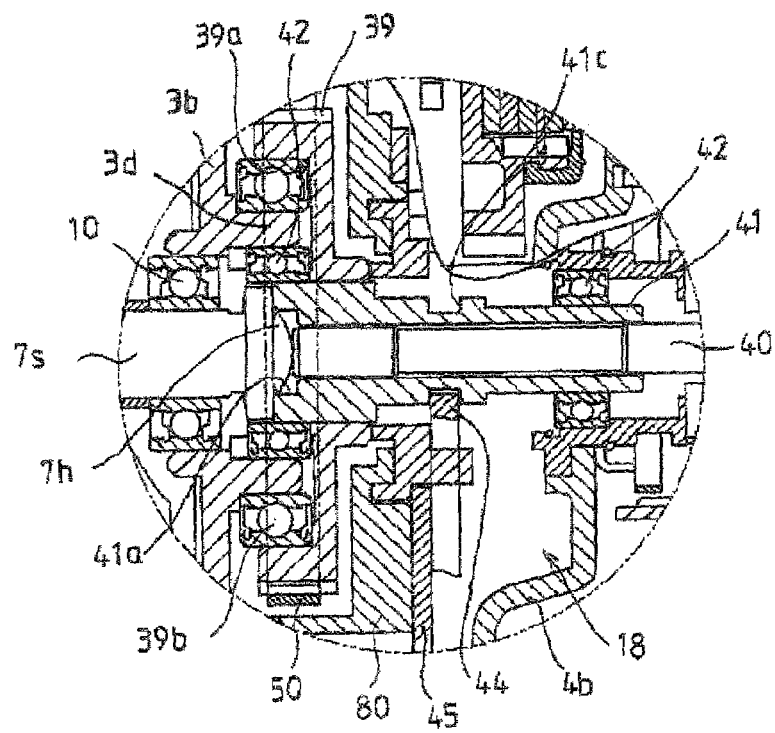
FIG. 2 is an enlarged view of essential portions of FIG. 1 and illustrates a power transmitting state (clutch ON)
Figure 3:
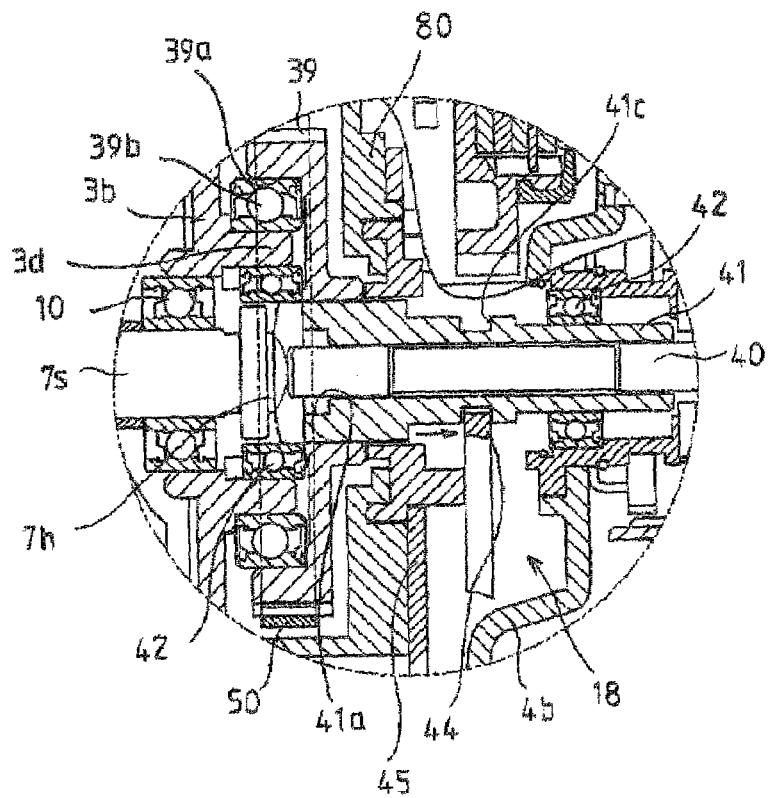
FIG. 3 is an enlarged view of the essential portions of FIG. 1 and illustrates a power cutoff state (clutch OFF)
Figure 4:
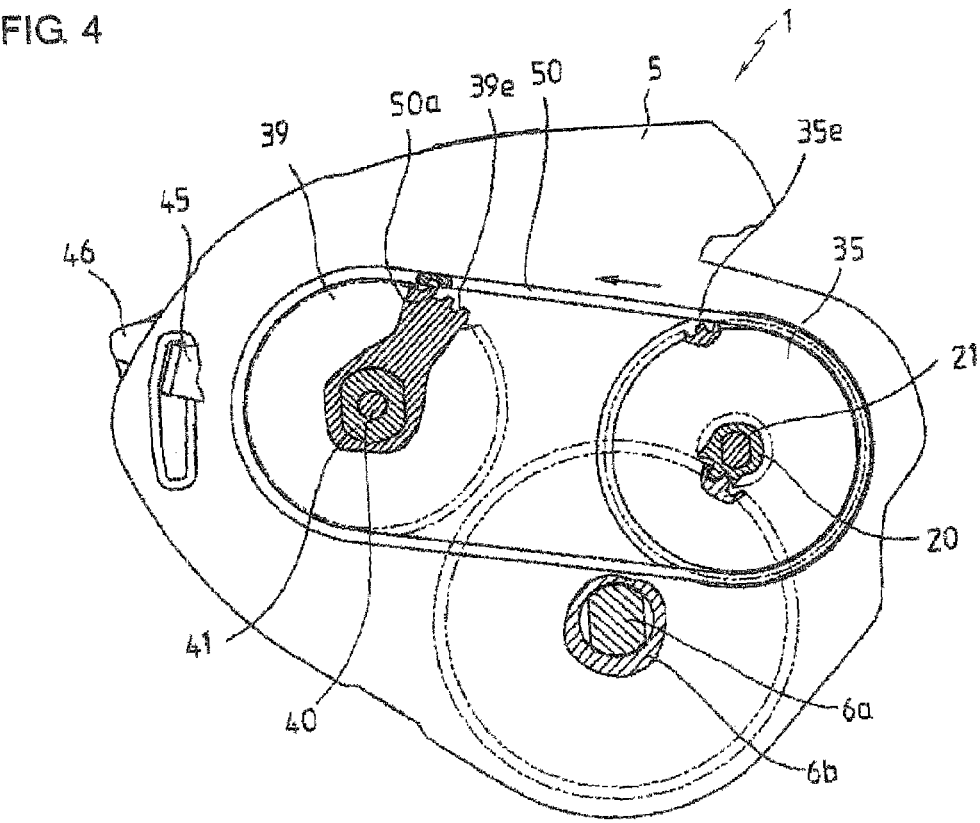
FIG. 4 is a partial cross-sectional view taken in a direction along line A-A of FIG. 1.
Figure 5:
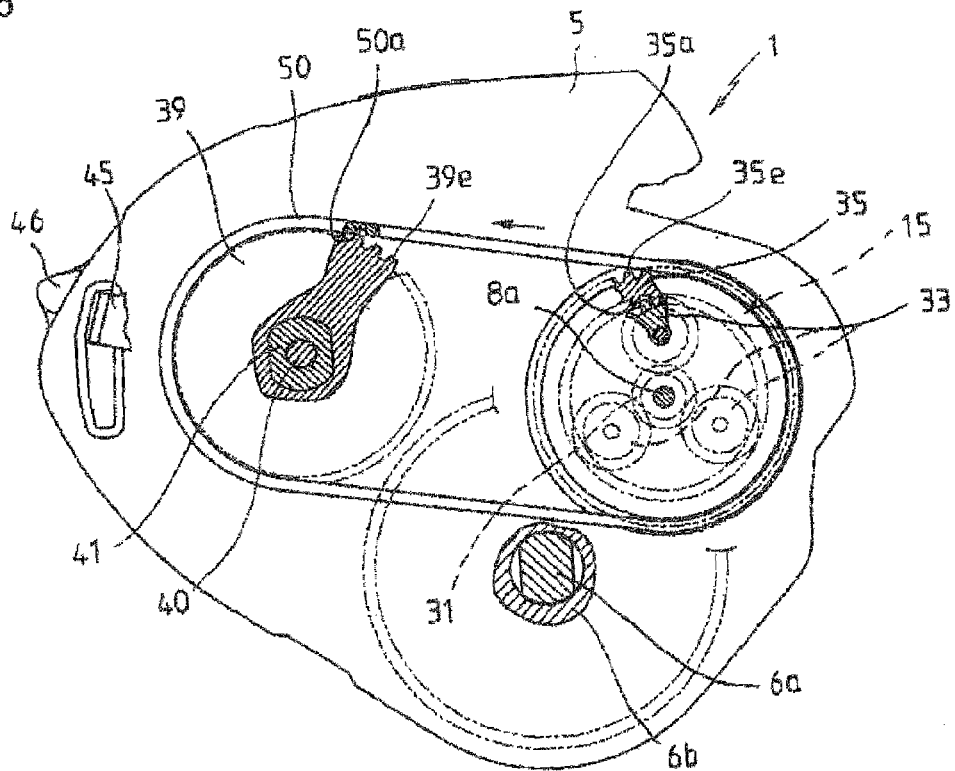
FIG. 5 is a partial cross-sectional view taken in a direction along line B-B of FIG. 1.

FIGS. 1 to 5 show an embodiment of an electric fishing reel in accordance with the invention. FIG. 1 is a plan view illustrating an internal structure. FIGS. 2 and 3 are enlarged diagrams illustrating essential portions shown in FIG. 1, in which FIG. 2 is a diagram illustrating a power transmitting state (clutch ON), and FIG. 3 is a diagram illustrating a power cutoff state (clutch OFF). FIG. 4 is a partial cross-sectional view taken from a direction along line A-A in FIG. 1, and FIG. 5 is a partial cross-sectional view taken from a direction along line A-A in FIG. 1.

An electric fishing reel 1 has a reel body 5 constructed by attaching outer side plates 4a and 4b to left and right frames 3a and 3b, respectively. A manual handle 6, which is operated for winding, is provided on one side plate (right side plate 4b) making up the reel body 5. A spool 7 around which a fishing line is wound is rotatably supported between the left and right frames 3a and 3b making up the reel body 5. A drive motor 8 is held between the left and right frames on the front side of the spool 7. The spool 7 is rotationally driven in a line winding direction through a below-described power transmission mechanism by the winding operation of the manual handle 6 and the rotational driving of the drive motor 8.

The spool 7 has a fishing line winding barrel portion 7a around which the fishing line is wound, and flanges 7b and 7c for restricting the fishing line being wound are formed at both ends thereof. In addition, the spool 7 is secured to a spool shaft 7s and is rotatably supported between the frames 3a and 3b as both ends of the spool shaft 7s are supported by the frames 3a and 3b through bearings 10. Further, a retaining portion 7h having a noncircular cross section is formed at an end of the spool shaft 7s on the side of the right side plate so that an engaging portion 41a of a clutch actuating member 41 of a below-described clutch mechanism is engaged with or disengaged from it. In this case, the retaining portion 7h is sufficient if it has the function of a power transmitting portion for allowing the clutch actuating member 41 and the spool 7 to be integrally rotated. The retaining portion 7h is formed by, for instance, recesses and projections, an irregular surface portion, or the like having a noncircular cross section.

A rotational driving force from the manual handle 6 and the drive motor 8 is adapted to be transmitted to the spool 7 by means of a power transmission mechanism 12. In this case, the power transmission mechanism 12 is provided with a planetary gear mechanism 15 for reducing the speed of the rotational drive of the drive motor 8 as well as a clutch mechanism 18 for switching the power transmission in the power transmission mechanism 12 between a power transmitting state and a power cutoff state. Hereafter, a description will be given of the construction of the power transmission mechanism 12, the planetary gear mechanism 15, and the clutch mechanism 18.

The power transmission mechanism 12 of this embodiment is installed in a concentrated manner on the right frame 42b side where the manual handle 6 of the reel body 5 is mounted. The power transmission mechanism 12 includes a handle shaft 6a for rotatably supporting the manual handle 6; a drive gear 6b fitted on the handle shaft 6a; a coupling gear 20 meshing with the drive gear 6b and coupled to the planetary gear mechanism 15; a first rotor 35 meshing with the planetary gear mechanism 15; a second rotor 39 for imparting a rotational driving force to the spool; and a belt 50 (preferably a toothed belt) wound around and trained between the rotors 35 and 39.

It should be noted that, between a below-described support casing 80 and the right outer side plate 4b, the coupling gear 20 is rotationally locked and fixed to a support pin 21 which is rotatably supported by means of bearings 21a and 21b. In addition, a known drag mechanism 9 is disposed between the handle shaft 6a and the drive gear 6b. The arrangement provided is such that as a drag knob 9a mounted on the handle shaft 6a is rotatively operated, a desired braking force is imparted to the rotation of the spool 7.

The planetary gear mechanism 15 is adapted to reduce the speed of the rotational driving force of the drive motor 8 by planetary gears, and includes a first sun gear 30 and a second sun gear 31 juxtaposed on a drive shaft 8a of the drive motor 8 as well as first planetary gears 32 and second planetary gears 33 respectively meshing therewith. In this case, the first sun gear 30 is fixed to the drive shaft 8a, while the second sun gear 31 is freely rotatable. Each of the planetary gears 32 and 33 meshes with internal teeth 34a formed on the first rotor 35 which is rotatably supported by the right frame 3b. Further, a first carrier 32a for supporting the first planetary gears 32 is coupled and fixed to the second sun gear 31, while a second carrier 33a for supporting the second planetary gears 33 is integrated with the support pin 21 projecting toward the right outer side plate and is coupled and fixed to the coupling gear 20.

An anti-reverse mechanism 6c is provided on the handle shaft 6a, and is adapted to prevent the interlocked rotation of the manual handle 6 when the drive motor 8 is rotationally driven. It should be noted that the anti-reverse mechanism 6c is configured as an anti-reverse ratchet which is mounted on the handle shaft 6a, but may be constituted by a one-way clutch. In addition, a one-way clutch 8d is mounted on a protruding portion on the left side plate side of the drive shaft 8a of the drive motor 8 so that the manual handle 6 will not idle during the winding operation, and so that power will be transmitted to the spool 7 side.

The rotational driving force of the first rotor 35 meshing with the planetary gear mechanism 15 is adapted to be transmitted to the second rotor 39 which is mounted concentrically with the spool 7 and is rotatably supported by the right frame 3b, i.e., a part of the reel body. The transmission of the rotational driving force between them is effected through the belt 50 for power transmission. Namely, irregular surface portions 35e and 39e, into which teeth (a U-shaped portion) 50a formed continuously on the inner side of the belt 50 are fitted, are respectively formed on the outer peripheral surfaces of the first rotor 35 and the second rotor 39. The arrangement provided is such that the power is transmitted as the belt 50 is wound around and trained between these rotors at these portions.

The second rotor 39 in this embodiment has a circular recess 39a formed on the spool side, and is rotatably supported by the right frame 3b by means of a bearing 39b provided between the inner surface of its peripheral surface and a cylindrical portion 3d formed on the right frame 3b in a protruding manner. Namely, the arrangement provided is such that the engaging portion 41a of the clutch actuating member 41 of the clutch mechanism 18 is disposed by being overlapped with the radially inward side of the bearing 39b serving as a supporting portion of the second rotor 39.

As a result, it becomes possible to reduce the length in the direction of the spool shaft having a clutch engaging portion, thereby making it possible to render the reel body 5 compact in size. It should be noted that the engaging portion 41a is sufficient if at least its portion is overlapped with the bearing 39b. Namely, the arrangement may be such that a recessed portion is formed in the second rotor 39, and at least a portion of the engaging portion 41a is located in this portion.

In addition, in this embodiment, the support casing (set plate) 80, which is attached to the right frame 3b, is installed between the right frame 3b and the right outer side plate 4b. The aforementioned power transmission mechanism 12 is accommodated inside this support casing 80. Preferably, it is sufficient if the support casing 80 accommodates the planetary gear mechanism 15 (planetary gears 32 and 33) whose driving noise is large, as well as the first rotor 35 meshing therewith. Further, the second rotor 39 and the belt 50 are accommodated therein. For this reason, the first rotor 35 is rotatably supported in the accommodating space between the support casing 80 and the right frame 3b by means of bearings 36a and 36b, respectively.

The clutch mechanism 18 includes a support pin 40 disposed concentrically with the spool shaft 7s between the right frame 3b and the right side plate 4b; the clutch actuating member 41 provided rotatably and axially movably between the right frame 3b and the right side plate 4b by means of a pair of bearings 42 in such a manner as to surround the support pin 40; an actuating plate 44 engaging with the clutch actuating member 41; a clutch switching member 45 for axially moving the clutch actuating member 41 by engaging with the actuating plate 44; and an operation lever 46 provided vertically movably between the side plates 4a and 4b in the rear of the spool 7 to drive the clutch switching member 45. It should be noted that the clutch actuating member 41 is fitted in and rotationally locked to a central portion of the second rotor 39 so as to be movable in the axial direction.

The engaging portion 41a, which is fitted to the retaining portion 7h having a noncircular cross section and formed on the spool shaft 7s, is formed on the spool side of the clutch actuating member 41. The engaging portion 41a and the retaining portion 7h are engageable with and disengageable from each other and have the cross-sectionally noncircular fitting relationship, as described above. When the both portions are fitted, the clutch actuating member 41 is rotationally driven by the second rotor 39, so that the spool 7 is integrally rotated by means of the spool shaft 7s.

The actuating plate 44 is engaged with a circumferential groove 41c disposed on the outer periphery of the clutch actuating member on the outer side of the supporting plate 80, whereby the clutch actuating member 41 is constantly urged toward the spool side. In this state, as shown in FIG. 2, the engaging portion 41a of the clutch actuating member 41 is fitted to the retaining portion 7h of the spool shaft 7s, so that the clutch mechanism 18 is in a power transmitting state (clutch ON). Meanwhile, if the operation lever 46 is operatively moved, the clutch actuating member 41 is slidingly driven toward the right outer side plate 4b side through the clutch switching member 45 and the actuating plate 44. In this state, the engaging portion 41a of the clutch actuating member 41 is disengaged from the retaining portion 7h, so that the clutch mechanism 18 is set in a power cutoff state (clutch OFF).

Here, the return from the clutch OFF state to the clutch ON state is effected by a known return mechanism through the winding operation of the manual handle 6 or the moving operation of the operation lever 46.

Next, a description will be given of a power transmission route for transmitting the driving force of the manual handle 6 and the drive motor 8 by the above-described power transmission mechanism 12.

If the winding operation of the manual handle 6 is carried out, its rotational driving force is delivered to the planetary gear mechanism 15 through the drive gear 6b, the coupling gear 20, and the support pin 21 (second carrier 33a). Further, the rotational driving force delivered to the planetary gear mechanism 15 is transmitted to the first rotor 35 in a decelerated state through the second sun gear 31, the first carrier 32a, and the first planetary gear 32 which rotates on its own axis while moving around the first sun gear 30 which is set in a fixed state by the one-way clutch 8d.

The rotating direction of this first rotor 35 is counterclockwise in FIGS. 4 and 5, and rotates the second rotor 39 similarly counterclockwise by means of the belt 50. As a result, the spool 7 is rotationally driven in the line winding direction through the clutch actuating member 41 which is rotationally locked to the second rotor 38.

Meanwhile, if the drive motor 8 is rotationally driven, the first sun gear 30 is rotationally driven clockwise in FIG. 5, and the first carrier 32a is rotationally driven clockwise by this rotational driving force. At this time, the second sun gear 31 is also rotationally driven clockwise, and the second carrier 33a also tends to be rotationally driven clockwise correspondingly. However, the second carrier 33a is unable to rotate clockwise through the coupling gear 20 owing to the anti-reverse mechanism 6c mounted on the drive gear 6b, with the result that the second planetary gears 33 rotate counterclockwise on their axes. As a result, the first rotor 35 is rotationally driven counterclockwise in a state of being decelerated by the rotation of the second planetary gears 33 on their axes.

Then, the counterclockwise rotation of the first rotor 35 rotates the second rotor 39 counterclockwise by means of the belt 50 in the same way as in the case of the above-described manual handle 6, and the spool 7 is rotationally driven in the line winding direction by means of the clutch actuating member 41 which is rotationally locked to the second rotor 39.

As described above, the clutch actuating member 41, which is supported by the pair of bearings 42 provided on the right frame 3b and the right side plate 4b, is fitted in the second rotor 39, to which the rotational driving force is delivered through the belt 50 by the winding operation of the manual handle 6 and by the rotational driving of the drive motor 8 and which is supported by the bearing 39b provided on the right frame 3b, such that the clutch actuating member 41 is uniquely fitted and rotationally locked so as to be movable in the axial direction. Therefore, the clutch engaging and disengaging operation can be carried out easily without any hindrance. Namely, when the clutch engaging and disengaging operation is being carried out, the meshing relationship between the gears in the power transmission mechanism 12 continues to be maintained, so that even if a large tensile force is applied to the fishing line by attaching heavy terminal tackle and weight to the fishing line, and a load is applied to the clutch engaging portion for driving to winding the spool 7, tooth faces are not damaged, and a light clutch-disengaging operation can be performed. In addition, since the power transmission to the spool 7 is effected not on the basis of the meshing relationship between the gears but by means of the belt 50, the noise due to the gear meshing during the driving of the drive motor 8 can be reduced, thereby permitting silent operation.

In addition, the support casing 80 is installed between the right frame 3b and the right outer side plate 4b, and accommodated therein is the power transmission mechanism 12, particularly the planetary gear mechanism 15 (planetary gears 32 and 33) whose drive noise is large, as well as the first rotor 35 and the second rotor 39 meshing therewith, and the belt 50. Therefore, it becomes possible to substantially suppress the occurrence of noise during the rotational driving of the spool. It goes without saying that the structure, the mode of installation, and the like of this support casing 80 may be modified, as required, and the supporting method and the arrangement mode of the power transmission mechanism 12 can also be modified, as required, correspondingly.

Although a description has been given of the embodiment of the invention, in the invention it is sufficient if the clutch actuating member 41 can be moved while the state of power transmission of the power transmission system is maintained intact so as to disengage the clutch, so that the construction of the above-described power transmission mechanism, planetary gear mechanism, and clutch mechanism as well as their form of arrangement can be modified, as required. In addition, in the above-described construction, the clutch actuating member 41 is sufficient if it is adapted to be rotated by the driving of the drive motor 8 and the rotative operation of the manual handle 6 and to be moved in the axial direction by an external switching operation, and the clutch actuating member 41 maybe constructed such that it is not fitted over the support pin 40. Furthermore, the retaining portion 7h for engagement with or disengagement from the engaging portion 41a of the clutch actuating member 41 is sufficient if it is provided on a portion which rotates integrally with the spool.

What is claimed is:

1. An electric fishing reel comprising:
   a reel body;
   a spool rotatably supported on the reel body;
   a drive motor and a manual handle provided on the reel body to rotationally drive the spool;
   a clutch mechanism for switching the spool between a power transmitting state and a power cutoff state;
   a rotor rotated by the drive motor and the manual handle; and
   a clutch actuating member which is fitted in and rotationally locked to the rotor so as to be movable in an axial direction and includes an engaging portion formed on one end of thereof, and a retaining portion rotated integrally with the spool,
   wherein the engaging portion is capable of being engaged with and disengaged from the retaining portion.

2. The electric fishing reel according to claim 1, wherein a belt is wound around the rotor for power transmission.

3. An electric fishing reel comprising:
   a reel body;
   a spool rotatably supported on the reel body;
   a drive motor and a manual handle provided on the reel body to rotationally drive the spool;
   a power transmission mechanism for transmitting rotational driving force based on the drive motor and the manual handle to the spool; and
   a clutch mechanism for switching the power transmission mechanism between a power transmitting state and a power cutoff state,
   wherein the power transmission mechanism includes:
      a planetary gear mechanism disposed on an output shaft of the drive motor;
      a first rotor having internal teeth with which a planetary gear of the planetary gear mechanism meshes and which is rotatably supported by the reel body;
      a second rotor which is driven and coupled to the first rotor through a belt and is rotatably supported by the reel body;
      a clutch actuating member which is fitted in and rotationally locked to the second rotor so as to be movable in an axial direction and is moved in an axial direction thereof by the clutch mechanism, the clutch actuating member including an engaging portion formed on one side thereof; and
      a retaining portion which is rotated integrally with the spool, and
   wherein the power transmission mechanism is capable of being switched between the power transmitting state and the power cutoff state by causing the engaging portion to engage with or disengage from the retaining portion.

4. The electric fishing reel according to claim 3, wherein a support casing for accommodating the first rotor, the second rotor, and the belt for driving and coupling the both rotors is installed within a side plate of the reel body on a side of the manual handle.

5. The electric fishing reel according to claim 3, wherein the engaging portion is overlappingly disposed on a radially inward side of a supporting portion of the reel body for rotatably supporting the second rotor.

6. An electric fishing reel comprising:
   a reel body;
   a spool rotatably supported on the reel body;
   a drive motor and a manual handle provided on the reel body to rotationally drive the spool;
   a power transmission mechanism for transmitting rotational driving force based on the drive motor and the manual handle to the spool; and
   wherein the power transmission mechanism includes:
      a planetary gear mechanism disposed on an output shaft of the drive motor;
      a first rotor having internal teeth with which a planetary gear of the planetary gear mechanism meshes and which is rotatably supported by the reel body;
      a second rotor which is driven and coupled to the first rotor through a belt and is rotatably supported by the reel body; and
      a drive gear disposed on a shaft of the manual handle to be rotated together with the first rotor;
   wherein driving force by a rotational operation of the manual handle is transmitted to the spool through the drive gear, the first rotor, the belt and the second rotor.

* * * * *